United States Patent
Wavre et al.

(10) Patent No.: US 7,205,687 B2
(45) Date of Patent: Apr. 17, 2007

(54) ELECTRIC MOTOR HAVING A COOLING SYSTEM

(75) Inventors: Nicolas Wavre, Areuse (CH);
Christophe Besson, Pontarlier (FR);
Emmanuel Dominé, Bôle (CH); Frank Krauchi, Yverdon (CH); Michel Napoli, Fleurier (CH); Stéphane Pellegrini, Montperrex (FR)

(73) Assignee: Etel SA, Môtiers NE (CH)

( * ) Notice: Subject to any disclaimer, the term of this patent is extended or adjusted under 35 U.S.C. 154(b) by 284 days.

(21) Appl. No.: 10/488,380

(22) PCT Filed: May 10, 2002

(86) PCT No.: PCT/EP02/05161

§ 371 (c)(1),
(2), (4) Date: Aug. 16, 2004

(87) PCT Pub. No.: WO03/019754

PCT Pub. Date: Mar. 6, 2003

(65) Prior Publication Data

US 2004/0251751 A1 Dec. 16, 2004

(30) Foreign Application Priority Data

Aug. 29, 2001 (CH) .................................... 1594/01

(51) Int. Cl.
*H02K 9/00* (2006.01)
*H02K 41/00* (2006.01)

(52) U.S. Cl. .......................................... 310/58; 310/12

(58) Field of Classification Search ............ 310/12–14, 310/52, 58, 59, 60, 60 A, 64
See application file for complete search history.

(56) References Cited

U.S. PATENT DOCUMENTS

| | | | |
|---|---|---|---|
| 3,863,083 A * | 1/1975 | Jaeschke | 310/52 |
| 4,839,545 A | 6/1989 | Chitayat | |
| 5,578,879 A | 11/1996 | Heidelberg et al. | |
| 5,642,013 A | 6/1997 | Wavre | |
| 5,723,917 A | 3/1998 | Chitayat | |
| 5,751,077 A | 5/1998 | Gonzalez | |
| 5,864,187 A | 1/1999 | Gonzalez | |
| 5,910,691 A | 6/1999 | Wavre | |
| 6,313,550 B1 * | 11/2001 | Binnard et al. | 310/2 |
| 6,339,266 B1 * | 1/2002 | Tanaka | 310/12 |

FOREIGN PATENT DOCUMENTS

EP 0 793 870 7/1988

* cited by examiner

*Primary Examiner*—Tran Nguyen
(74) *Attorney, Agent, or Firm*—Kenyon & Kenyon LLP

(57) ABSTRACT

An electric motor, e.g., a linear motor, includes a cooling system, which may permit the dissipation of heat from the primary part of the electric motor in a simple but effective manner. The iron core and the coils may be surrounded by a potting compound that stabilizes one of the coils and the electrical leads of the latter so that channels are formed in the gaps of the iron core. A coolant, e.g., air, flows from a first flow chamber through the channels into a second flow chamber. The direct contact with the iron core, potting compound, and optionally with the regions of the coils that are not filled with compound produces effective cooling action, without having to forego advantages of stability provided by an encapsulated primary part.

15 Claims, 2 Drawing Sheets

ELECTRIC MOTOR HAVING A COOLING SYSTEM

FIELD OF THE INVENTION

The present invention relates to an electric motor having a cooling system. The present invention may be used for rotary motors, and it may be used, e.g., for linear motors.

BACKGROUND INFORMATION

For many applications, in which linear movements must ultimately be made, a linear motor as a direct drive may provide advantages over a conventional rotary drive. Since no mechanical elements, such as ball spindles or toothed belts, are required for converting a rotational movement into a linear movement, the possible conveying speed and the positioning accuracy of such a direct drive may not be unnecessarily limited. In this context, speed and force may be controlled over a wide range. Problems with reversing play do not occur during the positioning. In the case of linear direct drives, a comparatively low amount of wear occurs with rapid and frequent changes of direction, so that the service life increases in comparison with rotary drives, and, in the process, the positioning accuracy may not decrease with the operating time.

These features make linear motors interesting for, e.g., pick-and-place applications. In this case, e.g., individual electronic circuits (chips) of a diced silicon wafer must be received and inserted into a housing. Since the chips are very small, several tens of thousands of chips may fit on a wafer of normal size. On one hand, a gripping arm must be able to work very rapidly (several chips per second), and, on the other hand, it must be positioned in a very exact manner, in order to avoid damaging the chips while receiving them, and to be able to position them with the accuracy necessary for further processing.

Waste heat, which causes the operating temperature to increase, is formed in the coils of the primary part of an electric motor. Since temperatures that are too high may lead to the destruction of the motor, one may not often dispense with a cooling system.

In European Patent No. 0 793 870, a synchronous motor (linear or rotary) having a cooling system is described, whose primary part also contains cooling tubes in the gaps of an iron ore, next to the coils. Coolant flows through the cooling tubes, in order to remove heat from the motor. Primary parts of this kind may be encapsulated with a synthetic resin, in order to ensure that the coils, the leads for the coils, and the cooling tubes are securely supported. The use of cooling coils means an additional expenditure and consequently increases the cost of a linear motor to a considerable extent.

In, for example, FIG. 8 of U.S. Pat. No. 4,839,545, is shown an iron core, whose plates have separate cooling channels. However, these cooling channels can be blocked by synthetic resin, when they are situated close to the coils (in order to ensure effective cooling). In order to completely encapsulate the coils, synthetic resin must initially be introduced beyond the fill level actually desired, since the synthetic resin shrinks in the further manufacturing process. In this context, residues of the synthetic resin can remain in the cooling channels and block them.

It was already proposed that the encapsulation of the primary part be eliminated, in order to attain simple cooling. U.S. Pat. No. 5,751,077 describes a primary part of a linear motor in a sealed housing, whose coils are in direct contact with a coolant, since encapsulation is completely dispensed with. The housing of the primary part forms, together with the iron core, two flow chambers, between which the coolant flows past the coils and consequently provides for their cooling. However, due to the forces acting on the electric lines in such a linear motor, the failure to encapsulate and, thus, fix the coils, and in particular the electrical leads for the cells, in position does not produce a stable set-up.

SUMMARY

It is an aspect of the present invention to provide an electric motor having a cooling system for the primary part. The cooling system may allow effective heat dissipation, may be simple to produce, and may ensure sufficient stability of the primary part.

In the primary part of an electric motor, the iron core, which supports the coils and has teeth and gaps, may be only partially encapsulated in its housing. At least one region of the gaps of the iron core may remain unencapsulated. These unencapsulated regions of the gaps form channels and connect flow chambers on both sides of the iron core. A coolant may flow from a first flow chamber through the unencapsulated regions into the second flow chamber, and in so doing, it may dissipate heat, due to the direct contact with the iron core and the potting compound that may be as thermally conductive as possible. It may be possible to introduce the potting compound so that a part of the coils also comes in direct contact with the coolant, which may achieve particularly effective heat dissipation.

DETAILED DESCRIPTION

Figure 1:
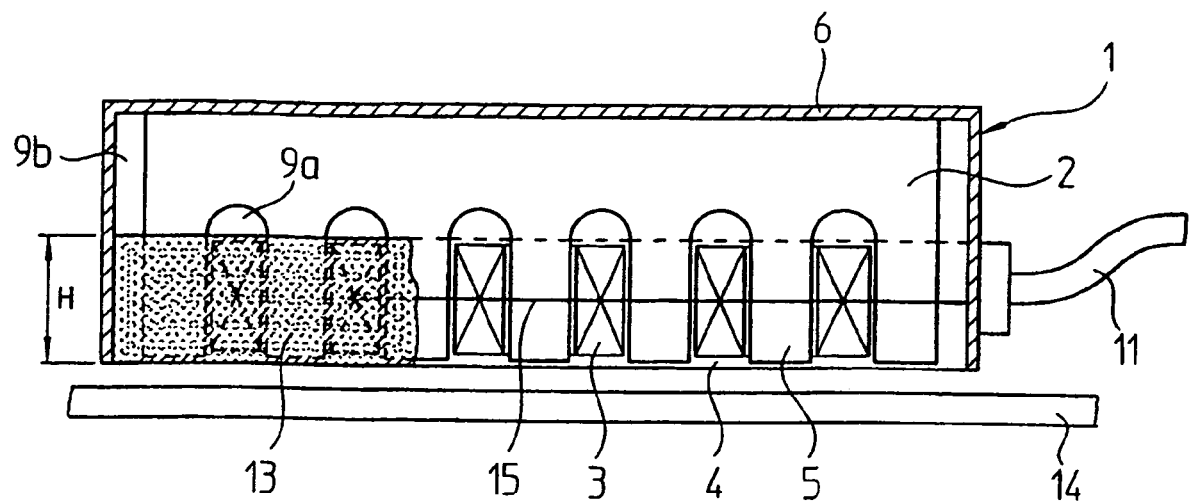
FIG. 1 illustrates a side view of a linear motor according to an exemplary embodiment of the present invention.
Figure 2:
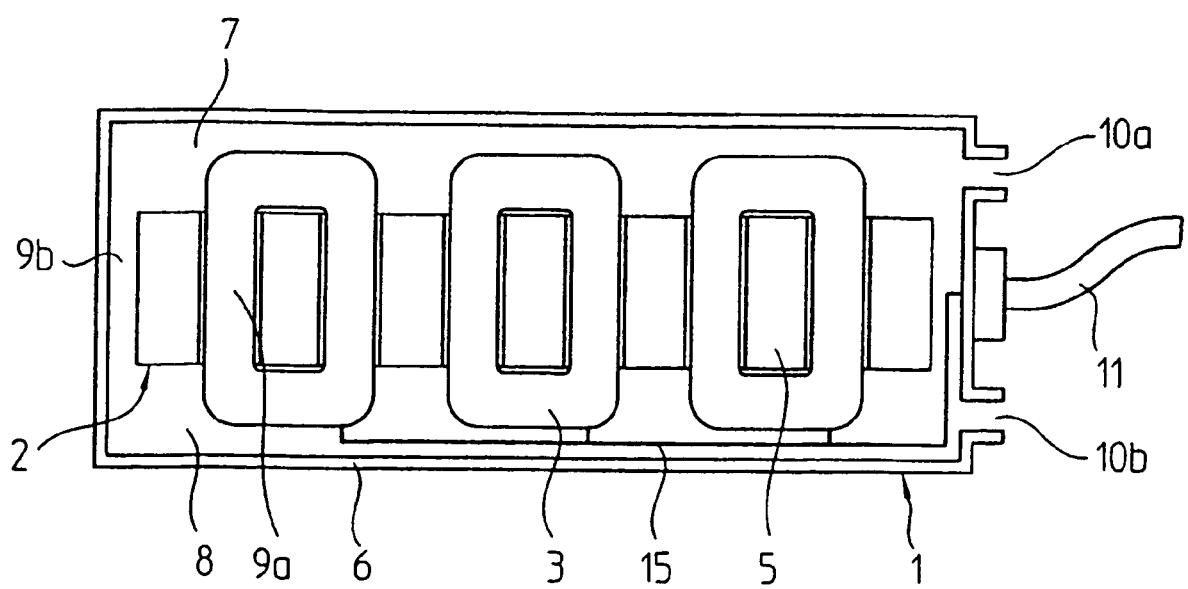
FIG. 2 illustrates a plan view of a primary part according to an exemplary embodiment of the present invention.

FIG. 1 shows a linear motor having primary part 1 and secondary part 14. Secondary part 14 may be made of, for example, a support having permanent magnets arranged in rows. Primary part 1 is made up of a housing 6 having an iron core 2, which includes teeth 5 and gaps 4 on the side facing secondary part 14. Iron core 2 is usually made up of punched and coated sheet-metal parts, in order to prevent eddy-current losses in iron core 2. Situated in gaps 4 are coils 3, which generate magnetic fields necessary for pushing the linear motor along, when they are sufficiently energized. Coils 4 of primary part 1 are supplied with current via an electrical terminal 11 on housing 6. Therefore, electrical leads 15 are placed inside housing 6, between electrical terminal 11 and individual coils 3. In an exemplary embodiment, coils 3 are prefabricated coils, which are slipped over teeth 5 and partially fill up gaps 4. As described in European Published Patent Application No. 0 793 870 discussed above, each coil 3 may wrap around only one tooth 5. It may be provided for only every second tooth 5 to be wound, as shown in FIG. 2. However, the cooling system for a linear motor described in the following may be used for other types of winding, for example, when coil 3 wraps around several teeth 5, and/or coils 3 partially overlap each other.

The ohmic losses in coils 3 produce waste heat, which heats primary part 1. If the temperature in the primary part increases too sharply, then the motor may be destroyed, since the insulation between the individual winding wires of coils 3 may be damaged (typically at or above approximately 130° C.). Thus, the heating of the motor limits the maximum current and, therefore, the maximum motor power and acceleration.

In addition to the removal of the heat, there may be a further problem in fixing coils 3 and their electrical leads 15 in position in a suitable manner. Since forces act on current-carrying conductors in magnetic fields, the current-carrying conductors are subject to a considerable mechanical loading. If the design of primary part 1 allows coils 3 or their electrical leads 15 to move, then they may be damaged due to wear (ruptured cable, short circuit). In addition, the quality of the motor control suffers, since the currents specified for the motor are not only converted into a (possibly desired) thrust, but also into (possibly unwanted) movements within the primary part. These problems particularly involve electrical leads 15 for coils 3.

According to an example embodiment of the present invention, a portion of primary part 1 may be provided with a potting compound 13. Synthetic resins having a high thermal conductivity and a high dielectric strength may be used here.

Coils 3 do not completely fill up gaps 4 between teeth 5, but leave open a portion of gap 4 on its end facing away from secondary part 14, as in, for example, the exemplary embodiment described with the aid of FIGS. 1 and 2. Potting compound 13 may be introduced up to a level H of the side of primary part 1 facing secondary part 14, so that coils 3 and their electrical leads 15 are completely covered and, therefore, fixed in position. However, level H is selected so that channels 9a are formed in gaps 4, where the volume of gaps 4 is not occupied by a coil 3.

As illustrated in FIG. 2, gaps 9a connect a first flow chamber 7 to a second flow chamber 8, which are otherwise separated from each other by iron core 2. Depending on the design, lateral channels 9b may also be formed, when iron core 2 does not fill up housing 6 over its entire length.

If a suitable coolant is forced through one or more connections 10a into first flow chamber 7, then this coolant will flow through channels 9a,b into second flow chamber 8 and leave it again through one or more connections 10b. In this context, a heat exchange occurs with all of the contact surfaces, for example, with iron core 2 and potting compound 13. Thus, in comparison with a non-cooled linear motor, effective cooling of primary part 1 is achieved without additional cooling tubes being necessary. In this context, coils 3 and their electrical leads 15 are fixed in position by potting compound 13.

Connections 10a,b may be positioned arbitrarily on housing 6, and therefore, in an optimized manner for the specific application. Thus, it is possible to position connections 10a,b on the side of housing 6, as is drawn, but it is also possible to feed or discharge the coolant via one or more connections 10a,b, through the upper side of housing 6. In each instance, no changes may be necessary in the interior of housing 6, since separate cooling tubes may be dispensed with.

Since it may be less important to fix coils 13 themselves in position than to fix electrical leads 15 in position, one may also reduce encapsulation level H. This results in a portion of coils 3 no longer being encapsulated and therefore being in direct contact with the coolant: The exposed regions of coils 3 in the two flow chambers 7, 8 and the surfaces of coils 3, which, together with iron core 2, form channels 9a. If one selects a lower encapsulation level H, as described, so that parts of coils 3 are exposed, then care may be taken that at least electrical leads 15 of coils 3 are fixed in position by the potting compound. For this purpose, it may be provided that at least 20% of the coils be encapsulated.

In electric motors, it may be customary for unencapsulated coils to at least be impregnated with a thin layer of synthetic resin, in order to prevent problems with moisture.

This measure may also be advisable for any unencapsulated regions of coils 3.

In this example embodiment a cover of housing 6 for secondary part 14 may be dispensed with. Potting compound 13 may seal tight housing 6.

Figure 3:
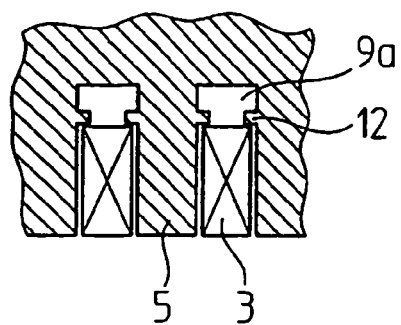
FIG. 3 illustrates a gap according to an exemplary embodiment of the present invention.

An exemplary design of gaps 4 is described in light of FIG. 3. In order to facilitate the positioning of prefabricated coils 3 into gaps 4, projections 12, which constitute a limit stop for coils 3 in their nominal position, are situated near the closed end of gaps 4. This may ensure that coils 3 also leave open the region necessary for forming channels 9a.

The cross-sectional area of gaps 4 reduced by the projection may increase again in the direction of the closed end of gaps 4, in order to obtain sufficiently sized channels 9a. The exact alignment of coils 3 may enable encapsulation height H to be set more precisely, when complete coverage of all coils 3 is desired. In addition, the aforementioned risk of a blockade formed by remaining potting compound 13 may not be present in the case of channels 9a according to FIG. 1 or FIG. 3, although channels 9a may be very close to coils 3. If the volume of potting compound 13 is reduced by the curing process, potting compound 13 may withdraw unhindered through gaps 4 in the direction of coils 3.

In an exemplary embodiment, it may be possible to introduce potting compound 13 so that channels 9a are situated on the side of coils 3 facing secondary part 14. Housing 6 may then be sealed by a cover (for instance, a thin plate or plastic) on the side facing secondary part 14.

In this example embodiment, coils 3 may still leave open regions of gaps 4, which face secondary part 14 and remain free of potting compound 13. This, in turn, forms channels 9a, which interconnect first and second flow chambers 7, 8.

In this manner, it is possible to not cover a part of coils 3 (now, facing secondary part 14) with potting compound 13 and to impregnate this part, if necessary.

Figure 4:
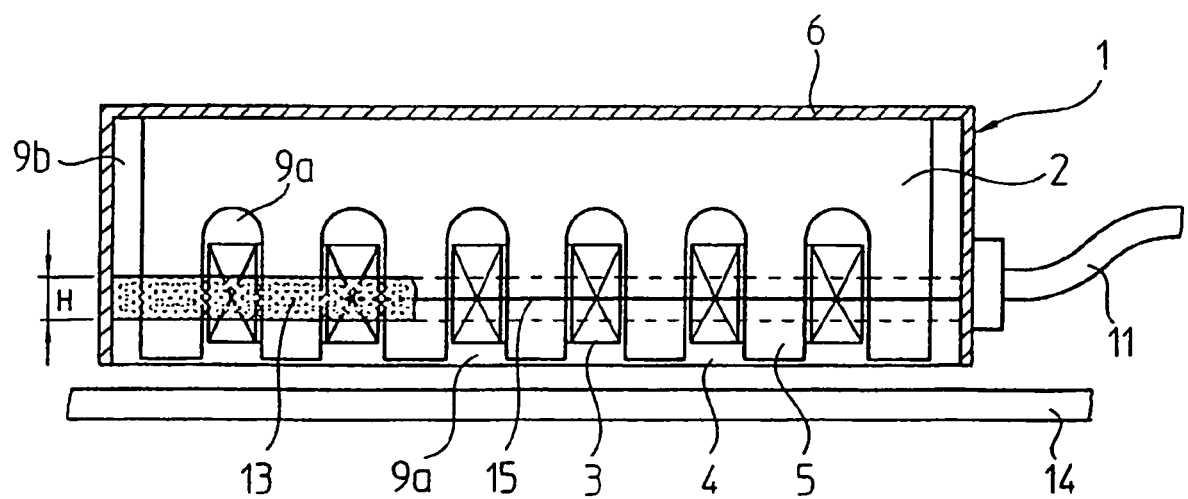
FIG. 4 illustrates a side view of an exemplary embodiment of the present invention.

An exemplary embodiment, which is represented in FIG. 4 and is made up a combination of the two first ones, may be more expensive to manufacture. Potting compound 13 is introduced so that only coils 3 are completely or partially covered. Regions of gaps 4 remain free of potting compound 13 on the side of coils 3 facing secondary part 14, and on the side of the coils facing away from secondary part 14, so that channels 9a interconnect first and second flow chambers 7, 8 on both sides of the coils. If coils 3 are not completely encapsulated, then the exposed regions of coils 3 may be impregnated. At least electrical leads 15 of coils 3 may be held by potting compound 13, for which an encapsulation level H of approximately 20% of the coil height may be considered to be a lower limiting value for useful stabilization.

While the first described exemplary embodiment having channels 9a on the side of coils 3 facing away from secondary part 14 may provide a certain heat shielding of primary part 1 in the direction of the side facing away from secondary part 14, the cooling in the second exemplary embodiment (channels 9a on the side of coils 3 facing secondary part 14) may prevent the heat input into secondary part 14 from being too large. This may substantially prevent demagnetization of the permanent magnets of secondary part 14. The third exemplary embodiment connects the cooling possibilities of the two first exemplary embodiments to each other.

Air may be used as a coolant, since it is already available in many applications. In certain applications, the air need not specifically be removed after it flows out of connection 10*b*. However, the present invention may theoretically be used with other gaseous coolants (e.g., inert gas) or liquid coolants (e.g., water, oil).

The present invention may be suited for linear motors, since, in this case, fill level H may easily be adjusted by controlling the volume of potting compound used. If one considers rotary motors to be curved linear motors, it becomes clear that the foregoing may also applicable to rotary motors without any further changes. Using suitable methods, one must only see to it that potting compound 13 leaves channels 9*a* open in gaps 4. This may be accomplished, for example, by encapsulating individual, approximately linear sections of iron core 2 step by step, or by subsequently removing potting compound 13 from a motor, which is completely encapsulated, as usual, and has closed gaps 4. The latter may also be an option for the production of linear motors, in particular for the third exemplary embodiment having channels 9*a* on both sides of coils 3.

What is claimed is:

1. An electric motor including a cooling system, comprising:
   a primary part including an iron core and coils that are arranged in gaps and that encircle teeth of the iron core, the primary part including a housing adapted to accommodate the iron core, a first flow chamber and a second flow chamber for a coolant formed on both sides of the iron core, a potting compound at least partially surrounding the coils so that the first flow chamber and the second flow chamber are at least connected by channels in the gaps, the housing including an electrical terminal, the primary part including electrical leads arranged inside the housing between the electrical terminal and the coils and adapted to supply current to the coils, the potting compound surrounding the electrical leads and fixing the coils and the electrical leads in position; and
   a secondary part.

2. The electric motor of claim 1, wherein the potting compound completely covers the coils.

3. The electric motor of claim 1, wherein the potting compound only partially covers the coils.

4. The electric motor of claim 3, wherein the potting compound covers at least 20% of the coils.

5. The electric motor of claim 3, wherein at least regions of the coils not surrounded by the potting compound are impregnated.

6. The electric motor of claim 1, wherein the coolant includes air.

7. The electric motor of claim 1, wherein, in a region of the first flow chamber, the housing includes at least one connection through which the coolant is suppliable.

8. The electric motor of claim 7, wherein, in a region of the second flow chamber, the housing includes at least one further connection through which the coolant is removable.

9. The electric motor of claim 1, wherein the channels are arranged on a side of the coils facing away from the secondary part.

10. The electric motor of claim 9, wherein the housing is sealed by the potting compound in a direction of the primary part.

11. The electric motor of claim 1, wherein the channels are arranged on a side of the coils facing the secondary part.

12. The electric motor of claim 1, wherein the channels are arranged on a side of the coils facing the secondary part and on a side of the coils facing away from the secondary part.

13. The electric motor of claim 1, wherein the electric motor includes a linear motor.

14. An electric motor of claim 1, including a cooling system, comprising:
   a primary part including an iron core and coils that are arranged in gaps and that encircle teeth of the iron core, the primary part including a housing adapted to accommodate the iron core, a first flow chamber and a second flow chamber for a coolant formed on both sides of the iron core, a potting compound at least partially surrounding the coils so that the first flow chamber and the second flow chamber are at least connected by channels in the gaps; and
   a secondary part
   wherein the gaps include a projection in a vicinity of a closed end, the projection arranged as a limit stop for the coils.

15. An electric motor including a cooling system, comprising:
   a primary part including:
      a housing;
      an iron core accommodated in the housing;
      a plurality of coils, each coil encircling a tooth of the iron core and arranged in gaps located between the teeth of the iron core;
      a potting compound at least partially surrounding the coils;
      a first flow chamber for a coolant flow formed on a first side of the iron core;
      a second flow chamber for the coolant flow formed on a second side of the iron core; and
      flow channels for the coolant flow, the flow channels connecting the first flow chamber and the second flow chamber, the channels arranged in the gaps located between the teeth of the iron core; and
   a secondary part.

* * * * *